United States Patent [19]
Yoshioka et al.

[11] Patent Number: 5,439,752
[45] Date of Patent: Aug. 8, 1995

[54] OPTICAL RECORDING MEDIUM AND REFLECTING FILM FOR USE THEREIN

[75] Inventors: Kazumi Yoshioka, Yawata; Takeo Ohta, Nara; Masami Uchida, Hirakata; Shigeaki Furukawa, Nara, all of Japan

[73] Assignee: Matsushita Electric Industrial Co., Ltd., Osaka, Japan

[21] Appl. No.: 66,921

[22] Filed: May 25, 1993

Related U.S. Application Data

[63] Continuation of Ser. No. 757,464, Sep. 10, 1991, abandoned.

[30] Foreign Application Priority Data

Sep. 11, 1990 [JP] Japan ................................. 2-242110

[51] Int. Cl.$^6$ .......................................... G11B 7/24
[52] U.S. Cl. .................................... 428/623; 428/650; 428/672; 428/694 RL; 428/928
[58] Field of Search ........ 428/611, 650, 607, 694 RL, 428/668, 672, 677, 928, 622, 623; 369/13, 288, 275.5, 275.2; 365/122

[56] References Cited

U.S. PATENT DOCUMENTS

| | | | |
|---|---|---|---|
| 4,390,600 | 6/1983 | Ohta et al. | 428/621 |
| 4,451,915 | 5/1984 | LaBudde et al. | 369/288 |
| 4,816,841 | 3/1989 | Kobayashi et al. | 346/76 L |

FOREIGN PATENT DOCUMENTS

| | | |
|---|---|---|
| 02308455 | 12/1909 | Japan . |
| 60-254433 | 12/1985 | Japan . |
| 254433 | 5/1986 | Japan . |
| 02058743 | 2/1990 | Japan . |
| 02218034 | 8/1990 | Japan . |

Primary Examiner—John Zimmerman
Attorney, Agent, or Firm—Wenderoth, Lind & Ponack

[57] ABSTRACT

A reflecting film for use in an optical recording medium, which essentially consists of gold. The reflecting film also is capable of including a second reflecting layer essentially made of aluminum. An optical recording medium includes a recording film, the reflecting layer(s), an adhesive layer, and a cover layer for covering a surface of the adhesive layer, which are formed on one surface of a transparent substrate in this order.

3 Claims, 2 Drawing Sheets

OPTICAL RECORDING MEDIUM AND REFLECTING FILM FOR USE THEREIN

This application is a continuation of now abandoned application Ser. No. 07/757,464, filed Sep. 10, 1991 now abandoned.

BACKGROUND OF THE INVENTION

The present invention relates to an optical recording medium which is capable of recording and reproducing and erasing information at a high density and in a large capacity by means of laser beam.

An information recording medium using laser beams for reading information or erasing recorded information by means of laser beams is provided with a reflecting metallic film formed in the rear surface thereof. The recording medium includes a video disk or a compact disk dedicated for an information reproduction; an information-adding type disk; a re-writable phase change type disk; a magnetic optical disk. For example, as shown in FIG. 5, a re-writable phase change type disk is made of a transparent substrate 1 consisting of polycarbonate having a laser beam guiding groove formed therein, a first dielectric layer 2 formed on the surface on which the groove of the transparent substrate 1 is formed, a recording film 3 formed on the first dielectric layer 2, a second dielectric layer 4 formed on the recording film 3, and a reflecting film 5 formed on the second dielectric layer 4, an adhesive layer 6 formed on the reflecting film 5, and a protecting plate 7 or another disk adhered to the adhesive layer 6. Normally, vacuum evaporation or sputtering is used to form the first and second dielectric layers 2 and 4, the recording film 3, and the reflecting layer 5. The reflecting film 5 is made of aluminum or aluminum alloy, which is inexpensive and has a high reflection factor.

Laser beams for recording, erasing, and reproducing information are incident on the substrate 1 in the direction shown by arrows (A). In order to do the recording, erasing, and reproducing operations, the intensity of laser beams are varied according to information which is recorded, erased or reproduced and the reflected beams are detected. A reflecting layer made of aluminum deteriorates in its optical performance. That is, an information-adding type or re-writable optical recording medium greatly deteriorates in its reading and writing performance. The reason is as follows: the corrosion of the reflecting layer 5 made of aluminum causes the reflecting layer 5 to become irregular, and consequently, the reflection factor of the reflecting layer 5 is reduced. The corrosion-resisting performance of the reflecting layer 5 may be improved to some extent by using aluminum of high purity, but crystal growth cannot be avoided. An additive may be mixed with aluminum powder to improve corrosion-resisting performance of the reflecting layer 5, but it cannot be improved as desired.

SUMMARY OF THE INVENTION

Accordingly, an object of the present invention is to provide a reflecting film for use in an optical recording medium having a reflecting layer which is chemically stable and can be manufactured at a low cost.

Another object of the present invention is to provide an optical recording medium having a reflecting layer which is chemically stable and can be manufactured at a low cost.

In accomplishing these and other objects, there is provided a reflecting film for use in an optical recording medium, essentially consisting of gold.

According to the above construction, since the reflecting film essentially consists of gold, the reflecting film can avoid being corroded or oxidized by water or acid which may penetrate through the other layer if it exists or be discharged from the other layer.

According to another aspect of the present invention, there is provided an optical recording medium comprising: a recording film; a first reflecting layer essentially made of gold; an adhesive layer; and a cover layer for covering a surface of the adhesive layer, which are formed on one surface of a transparent substrate in this order.

According to the above construction, the medium includes at least two reflecting layers, that is, the first reflecting layer essentially made of gold and the second reflecting layer essentially made of aluminum. Therefore, the first reflecting layer can prevent the second reflecting layer from being corroded or oxidized by water penetrated through the cover layer and/or the adhesive layer or acid discharged from the adhesive agent of the adhesive layer when the adhesive layer is hardened.

BRIEF DESCRIPTION OF THE DRAWINGS

These and other aspects and features of the present invention will become clear from the following description taken in conjunction with the preferred embodiments thereof with reference to the accompanying drawings, in which.

DETAILED DESCRIPTION OF THE INVENTION

Figure 1:
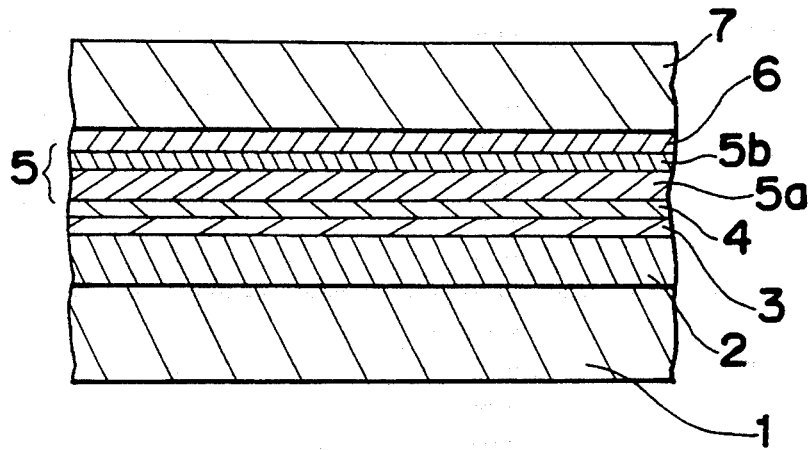
FIG. 1 is a partially omitted sectional view showing an optical recording medium according to a first embodiment of the present invention.

Before the description of the present invention proceeds, it is to be noted that like parts are designated by like reference numerals throughout the accompanying drawings.

First embodiment

Referring to FIG. 1, a first embodiment of the present invention is described below.

An optical recording medium includes a first dielectric layer 2, a recording film 3, a second dielectric layer 4, a reflecting layer 5, an adhesive layer 6, and a protecting plate 7 serving as a cover layer for covering a surface of the adhesive layer 6, which are formed on one surface of a transparent substrate 1 in this order. The recording film 3 is made of either germanium-tellurium-antimony or indium-antimony-tellurium for recording information by changing phase of the material. Instead, the recording film 3 may be made of terbium-iron-cobalt for recording information in a magnetic optical manner. The reflecting layer 5 includes a first thin film 5b mainly consisting of gold chemically stabilized, and a second thin film 5a mainly consisting of aluminum. The first thin film 5b is positioned between the second thin film 5a and the adhesive layer 6 mainly made of adhesive agent. The second thin film 5a is positioned between the first thin film 5b and the second dielectric layer 4. The first thin film 5b serving as a barrier layer prevents the second thin film 5a from being corroded or oxidized by water penetrated through the protecting plate 7 and/or the adhesive layer 6 or acid discharged from the adhesive agent of the adhesive layer 6 when it is hardened. Favorably, the thickness of the second thin film 5a is in the range from 10 to 150 nm and more favorably, 60 to 130 nm. It is preferable that the thickness of the first thin film 5b ranges from 10 to 30 nm. If the thickness of the first thin film 5b is not larger than 9 nm, the first thin film 5b can not be formed on the whole surface of the adhesive layer 6 and then, the first thin film 5b is formed in the shape of dots on the surface of the adhesive layer 6, which is ineffective as a barrier layer. Much material is required to form the first thin film 5b in a thickness greater than 30 nm, which is expensive. As such, the thickness of the first thin film 5b is preferably in the range from 10 to 30 nm.

According to the first embodiment, a disk was composed of the first dielectric layer 2 of approximately 150 nm, the recording film 3 of approximately 30 nm, the second dielectric layer 4 of approximately 20 nm, the second thin film 5a of approximately 100 nm, and the first thin film 5b of approximately 20 nm formed on the substrate 1 in this order. The protecting plate 7 of polycarbonate was positioned on the adhesive layer 6 provided on the first thin film 5b. The adhesive layer 6 mainly consisted of an adhesive agent which was hardened by ultraviolet rays. An accelerated test was conducted on the disk placed in an atmosphere of relative humidity of 80% for one month so as to examine the corrosion-resisting performance of the reflecting film. The result is that the reflecting film was not corroded.

In the first embodiment, the reflecting film 5 may be only the first thin film 5b which essentially consists of gold in order to avoid being corroded or oxidized by water or acid which may penetrate through the other layer if it exists or be discharged from the other layer. Also, the reflecting film 5 additionally may include the other reflecting film for reflecting light and conducting away heat generated on the recording film 3 when information is recorded thereon with laser beams. Furthermore, instead of the first embodiment, the first thin film 5b may consist of only gold, and the second thin film 5a may consist of only aluminum.

Second embodiment

Figure 2:
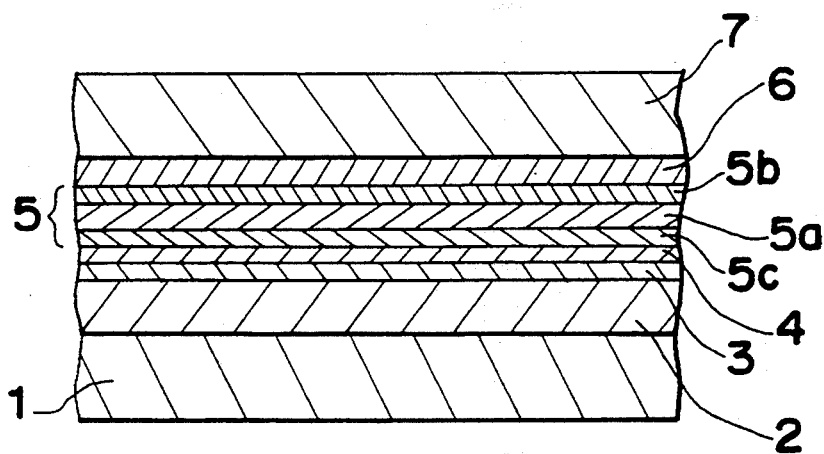
FIG. 2 is a partially omitted sectional view showing an optical recording medium according to a second embodiment of the present invention.
Figure 5:
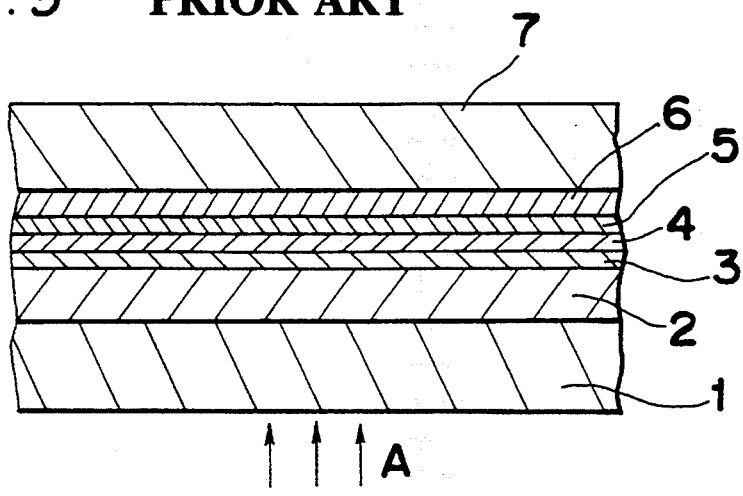
FIG. 5 is a partially omitted sectional view showing a conventional construction of an optical recording medium.

A second embodiment is described below with reference to FIG. 2. The second embodiment is different from the first embodiment in the construction of the reflecting layer. That is, the first and third thin films 5b and 5c of gold are formed on both sides of the second thin film 5a of gold. The third thin film 5c improves the reflection factor of the film of the reflecting layer. Preferably, the thickness of each of the first and third thin films 5b and 5c is in the range from 10 to 30 nm. If the thickness thereof is not larger than 9 nm, the first and third thin films 5b and 5c are formed in the shape of dots on the surfaces of the adhesive layer 6 and the second thin film 5a, respectively and consequently, the first, second, and third thin films 5b, 5a, and 5c have the following disadvantages. That is, the effect of the third thin film 5c for improving the reflection factor of the reflecting layer deteriorates. When the thickness thereof is not larger than 9 nm, water penetrates into the second thin film 5a via the gap of the first thin film 5b to deteriorate the second thin film 5a. It costs much money to form the first and third thin films 5b and 5c having the thickness of more than 40 nm. As described in the first embodiment, the first and third thin films 5b and 5c prevent the second thin film 5a from being corroded or oxidized by water which has penetrated through the protecting plate 7 and/or the adhesive layer 6 or by acid discharged from the adhesive agent of the adhesive layer 6 when it is hardened.

According to the second embodiment, the thickness of the first dielectric layer 2, the second dielectric layer 4, and the recording film 3 was the same as that of the first embodiment, respectively. Similarly to the first embodiment, the reflecting layer consisted of the third thin film 5c in the thickness of 20 nm, the second thin film 5a in the thickness of 100 nm, and the first thin film 5b in the thickness of 20 nm. The protecting plate 7 is positioned on the adhesive layer 6 provided on the first thin film 5b. The adhesive layer 6 mainly consisted of an adhesive agent which is hardened by ultraviolet rays. Thus, a disk was formed. Similarly to the first embodiment, an accelerated test was conducted on the disk placed in an atmosphere of relative humidity of 80% for one month so as to examine the corrosion-resisting performance of the reflecting film. The result is that the reflecting film was not corroded.

Third embodiment

Figure 3:
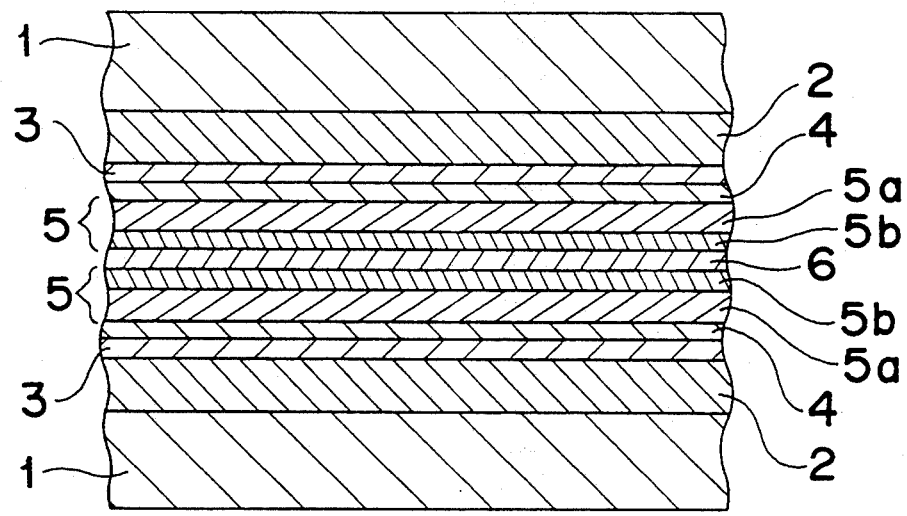
FIG. 3 is a partially omitted sectional view showing an optical recording medium according to a third embodiment of the present invention.

A third embodiment of the present invention is described below with reference to FIG. 3. The third embodiment is different from the first embodiment in the construction of the cover layer formed on the adhesive layer 6. That is, although the cover layer is the protecting layer 7 in the first embodiment, the cover layer has the reflecting layer 5 including the first and second thin films 5b and 5a, the second dielectric layer 4, the recording film 3, the first dielectric layer 2, and the transparent substrate 1 in the third embodiment. According to the third embodiment, a similar effect can be obtained.

Fourth embodiment

Figure 4:
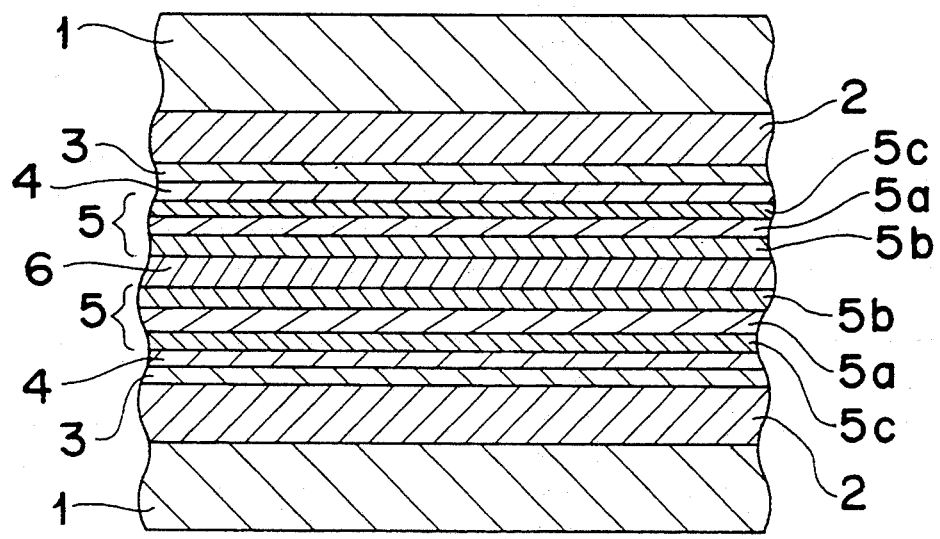
FIG. 4 is a partially omitted sectional view showing an optical recording medium according to a fourth embodiment of the present invention.

A fourth embodiment of the present invention is described below with reference to FIG. 4. The fourth embodiment is different from the second embodiment in the construction of the cover layer formed on the adhesive layer 6. That is, although the cover layer is the protecting layer 7 in the second embodiment, the cover layer has the reflecting layer 5 including the first, second, and third thin films 5b, 5a, and 5c, the second dielectric layer 4, the recording film 3, the first dielectric layer 2, and the transparent substrate 1 in the fourth embodiment. According to the fourth embodiment, a similar effect can be obtained.

According to the first through fourth embodiments, as described above, the reflecting layer includes at least two thin films, that is, the second thin film mainly consisting of aluminum and the first thin film mainly consisting of gold and formed on one surface of the second thin film. Therefore, the first thin film mainly consisting of gold prevents the second thin film mainly consisting of aluminum from being corroded or oxidized by water penetrated through the protecting plate and/or the adhesive layer or acid discharged from the adhesive agent of the adhesive layer when the adhesive layer is hardened. In order to form the first and second thin films, the second thin film mainly consisting of aluminum is coated with the first thin film mainly consisting of gold, which reduces manufacturing cost.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A reflecting film of a phase change rewritable disc, said reflecting film located over a recording film and a substrate of said phase change rewritable disc, said recording film interposed between said reflecting thin film and said substrate, said reflecting film consisting essentially of a first reflecting layer consisting essentially of gold and a second reflecting layer consisting essentially of aluminum, wherein the second reflecting layer is positioned between the recording film and the first reflecting layer.

2. The reflecting film for use in a phase change rewritable disc, as claimed in claim 1, wherein the first reflecting layer has a thickness of 10–30 nm and the second reflecting layer has a thickness of 10–150 nm.

3. A reflecting film, positioned over a substrate, of a phase change rewritable disc, consisting essentially of a first reflecting layer consisting essentially of gold and a second reflecting layer consisting essentially of aluminum, wherein the second reflecting layer is interposed between the substrate and the first reflecting layer, and wherein the first reflecting layer has a thickness of 10–30 nm and the second reflecting layer has a thickness of 60–150 nm.

* * * * *